United States Patent
Miura et al.

(10) Patent No.: US 9,544,456 B2
(45) Date of Patent: *Jan. 10, 2017

(54) SHEET CONVEYING DEVICE

(71) Applicant: Brother Kogyo Kabushiki Kaisha, Nagoya-shi, Aichi-ken (JP)

(72) Inventors: Katsuro Miura, Toyota (JP); Yoshinori Osakabe, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/954,483

(22) Filed: Nov. 30, 2015

(65) Prior Publication Data

US 2016/0094742 A1    Mar. 31, 2016

Related U.S. Application Data (63) Continuation of application No. 13/417,383, filed on Mar. 12, 2012, now Pat. No. 9,203,996.

(30) Foreign Application Priority Data

Sep. 30, 2011   (JP) .................................. 2011-218079

(51) Int. Cl.
*B65H 31/00* (2006.01)
*H04N 1/00* (2006.01)
(Continued)

(52) U.S. Cl.
CPC ............ *H04N 1/00649* (2013.01); *B65H 5/06* (2013.01); *B65H 29/20* (2013.01);
(Continued)

(58) Field of Classification Search
CPC ......... B65H 29/00; B65H 31/00; B65H 29/60; G03G 15/00
(Continued)

(56) References Cited

U.S. PATENT DOCUMENTS 5,358,239 A    10/1994   Hario et al.
5,624,107 A *   4/1997   Deguchi ................ G03G 15/60
                                                271/145

(Continued)

FOREIGN PATENT DOCUMENTS

JP    61-124467 A    6/1986
JP    61-269140 A    11/1986
(Continued)

OTHER PUBLICATIONS

Co-pending U.S. Appl. No. 13/417,395, filed Mar. 12, 2012.
(Continued)

*Primary Examiner* — Thomas Morrison
(74) *Attorney, Agent, or Firm* — Banner & Witcoff, Ltd.

(57) ABSTRACT

An image scanning device includes a scanning unit configured to scan, at a scanning position, an image of a document, a first discharge portion, a second discharge portion, a conveying unit configured to selectively convey the document along a first conveying path from the scanning position to the first discharge portion, and along a second conveying path from the scanning position to the second discharge portion, a driving unit configured to generate a driving force for driving the conveying unit, and a cover member configured to receive the driving force generated by the driving unit such that the cover member moves between a closed position for covering the second discharge portion and an open position for exposing the second discharge portion.

19 Claims, 10 Drawing Sheets

(51) Int. Cl.
  *B65H 5/06* (2006.01)
  *B65H 29/20* (2006.01)
(52) U.S. Cl.
  CPC ..... *H04N 1/00519* (2013.01); *H04N 1/00525* (2013.01); *H04N 1/00588* (2013.01); *H04N 1/00591* (2013.01); *H04N 1/00633* (2013.01); *H04N 2201/0081* (2013.01)
(58) Field of Classification Search
  USPC .................................................. 271/207, 213
  See application file for complete search history.

(56) References Cited

U.S. PATENT DOCUMENTS

| | | |
|---|---|---|
| 5,730,537 A | 3/1998 | Kelly et al. |
| 5,755,435 A | 5/1998 | Fujiwara |
| 6,027,108 A | 2/2000 | Johdai et al. |
| 6,126,163 A | 10/2000 | Katsuta et al. |
| 6,321,064 B1 | 11/2001 | Mizubata et al. |
| 6,612,561 B2 | 9/2003 | Sekine |
| 6,882,822 B2 | 4/2005 | Gomi et al. |
| 7,016,090 B2 | 3/2006 | Sekine |
| 7,595,903 B2 | 9/2009 | Kizaki et al. |
| 7,637,502 B2 | 12/2009 | Ata et al. |
| 7,699,312 B2 | 4/2010 | Fukuda et al. |
| 7,726,650 B2 | 6/2010 | Tu |
| 7,731,779 B2 | 6/2010 | Palumbo |
| 7,826,105 B2 | 11/2010 | Yamaguchi |
| 7,883,285 B2 | 2/2011 | Asada et al. |
| 7,905,482 B2 * | 3/2011 | Matsumoto ............ B65H 31/02 271/207 |
| 7,941,068 B2 | 5/2011 | Kimura |
| 7,976,020 B2 | 7/2011 | Awai |
| 8,020,853 B2 | 9/2011 | Shiraki et al. |
| 8,104,765 B2 | 1/2012 | Tsuchiya et al. |
| 8,109,498 B2 | 2/2012 | Akimatsu |
| 8,141,874 B2 | 3/2012 | Fukuda et al. |
| 8,172,225 B2 | 5/2012 | Tanahashi |
| 8,177,219 B2 | 5/2012 | Chen et al. |
| 8,235,385 B2 | 8/2012 | Shimizu |
| 8,336,877 B2 | 12/2012 | Yamamoto et al. |
| 8,493,639 B2 | 7/2013 | Samoto et al. |
| 8,764,005 B2 | 7/2014 | Tajima |
| 9,203,996 B2 * | 12/2015 | Miura ................ H04N 1/00519 |
| 2002/0056957 A1 | 5/2002 | Sekine |
| 2002/0181969 A1 | 12/2002 | Terada et al. |
| 2003/0202218 A1 | 10/2003 | Morinaga et al. |
| 2004/0184824 A1 | 9/2004 | Hirai et al. |
| 2005/0140086 A1 | 6/2005 | Ono et al. |
| 2005/0212195 A1 | 9/2005 | Ohama et al. |
| 2006/0192831 A1 | 8/2006 | Fukuda et al. |
| 2006/0214351 A1 * | 9/2006 | Watanabe ................ B65H 1/04 271/3.14 |
| 2008/0175627 A1 | 7/2008 | Sato |
| 2008/0240823 A1 | 10/2008 | Asada |
| 2009/0027744 A1 | 1/2009 | Kim |
| 2009/0072466 A1 | 3/2009 | Shishikura |
| 2009/0295082 A1 | 12/2009 | Awai |
| 2009/0302520 A1 | 12/2009 | Shimmachi et al. |
| 2009/0315253 A1 | 12/2009 | Osakabe et al. |
| 2010/0074640 A1 | 3/2010 | Okano |
| 2010/0187756 A1 | 7/2010 | Fukuda et al. |
| 2010/0314822 A1 * | 12/2010 | Tsao ......................... B65H 5/26 271/3.14 |
| 2011/0180648 A1 * | 7/2011 | Onozato ................ B41J 2/0057 242/412 |
| 2011/0199654 A1 | 8/2011 | Takata |
| 2011/0273753 A1 | 11/2011 | Yonemura et al. |
| 2012/0013930 A1 | 1/2012 | Kondo |
| 2013/0083376 A1 | 4/2013 | Miura et al. |
| 2013/0187330 A1 | 7/2013 | Kuroda et al. |
| 2013/0235433 A1 | 9/2013 | Osakabe et al. |
| 2013/0235436 A1 | 9/2013 | Osakabe et al. |
| 2013/0272770 A1 | 10/2013 | Asada et al. |
| 2013/0293930 A1 | 11/2013 | Araki et al. |

FOREIGN PATENT DOCUMENTS

| | | |
|---|---|---|
| JP | 02-291352 A | 12/1990 |
| JP | H04-109747 A | 4/1992 |
| JP | H05-147799 A | 6/1993 |
| JP | H06-156846 A | 6/1994 |
| JP | H07-252004 A | 10/1995 |
| JP | 08-067395 A | 3/1996 |
| JP | 08-133553 A | 5/1996 |
| JP | H08-286450 A | 11/1996 |
| JP | H09-80836 A | 3/1997 |
| JP | 2821011 B2 | 11/1998 |
| JP | 11-127301 A | 5/1999 |
| JP | 2000-026003 A | 1/2000 |
| JP | 2000-165594 A | 6/2000 |
| JP | 2001-019255 A | 1/2001 |
| JP | 2002-012354 A | 1/2002 |
| JP | 2003-081445 A | 3/2003 |
| JP | 2003-270734 A | 9/2003 |
| JP | 3485651 B2 | 1/2004 |
| JP | 2005-306548 A | 11/2005 |
| JP | 3750643 B2 | 3/2006 |
| JP | 2006-232525 A | 9/2006 |
| JP | 2006-240848 A | 9/2006 |
| JP | 3855475 B2 | 12/2006 |
| JP | 3907852 B2 | 4/2007 |
| JP | 2007-302402 A | 11/2007 |
| JP | 2010-006608 A | 1/2010 |
| JP | 2010-017998 A | 1/2010 |
| JP | 4447764 B2 | 4/2010 |
| JP | 2011-171957 A | 9/2011 |
| JP | 2011-254213 A | 12/2011 |
| JP | 2013-052929 A | 3/2013 |
| JP | 2013-078070 A | 4/2013 |

OTHER PUBLICATIONS

Non-final Office Action received in U.S. Appl. No. 13/417,395 mailed Aug. 15, 2013.
Notice of Allowance issued in U.S. Appl. No. 13/417,395 mailed Nov. 12, 2013.
JP Office Action mailed Oct. 15, 2013, JP Appln. 2011-218079, English translation.
JP Notice of Reasons for Rejection mailed Jan. 14, 2014, JP App. 2011-218078, English translation.
May 22, 2014—(US) Non-Final Office Action—U.S. Appl. No. 13/755,259.
Aug. 1, 2014—(US) Non-Final Office Action—U.S. Appl. No. 13/755,235.
Sep. 3, 2014—(US) Non-Final Office Action—U.S. Appl. No. 14/203,627.
Jul. 22, 2014—(JP) Notice of Reasons for Rejection—App 2012-081324—Eng Tran.
Oct. 2, 2014—(US) Notice of Allowance and Fee(s) Due—U.S. Appl. No. 13/755,259.
Nov. 14, 2014—(US) Notice of Allowance—U.S. Appl. No. 14/203,627.
Feb. 6, 2015—(US) Non-Final Office Action—U.S. Appl. No. 13/755,235.
Aug. 4, 2015—(JP) Notice of Reasons for Rejection—App 2014-079950, Eng Tran.
Mar. 8, 2016—(JP) Notice of Reasons for Rejection—App 2012-081323, partial Eng Tran.

* cited by examiner

SHEET CONVEYING DEVICE

CROSS REFERENCE TO RELATED APPLICATION

This application is a continuation of prior U.S. application Ser. No. 13/417,383, filed Mar. 12, 2012, which claims priority from Japanese Patent Application No. 2011-218079, filed on Sep. 30, 2011, the entire disclosure of which is incorporated herein by reference.

BACKGROUND OF THE INVENTION

1. Field of the Invention

The present invention relates to an image scanning device.

2. Description of Related Art

A known image scanning device comprises an automatic document feeder (hereinafter referred to as ADF), and the ADF comprises a path switching unit configured to selectively move between a first position for guiding a document along a first conveying path and a second position for guiding a document along a second conveying path. A document guided along the second conveying path after an image of the document is scanned is discharged from a discharge portion rearward of the image scanning device.

In such an image scanning device, if a movable member, e.g., a cover member, is provided at the discharge portion and if a driving source (e.g., a motor) is provided exclusively for driving the movable member to move two positions relative to the discharge portion, a wire harness and the like is required for controlling the driving source. Thus, the manufacturing cost may increase because the number of parts and the assembly man-hour increase. The device size may increase because of an extra space required for the driving source and the wire harness. An extra cost may be required to prevent electrical noise which may be generated more as driving sources and wire harnesses increase in number.

SUMMARY OF THE INVENTION

Therefore, a need has arisen for an image scanning device that comprises a movable member configured to move to one of two positions relative to a discharge portion to allow a document to be conveyed to or through the discharge portion, while a driving source exclusively for the movable member is eliminated.

According to an embodiment of the invention, an image scanning device comprises a scanning unit configured to scan, at a scanning position, an image of a document, a first discharge portion, a second discharge portion, a conveying unit configured to selectively convey the document along a first conveying path from the scanning position to the first discharge portion, and along a second conveying path from the scanning position to the second discharge portion, a driving unit configured to generate a driving force for driving the conveying unit, and a cover member configured to receive the driving force generated by the driving unit such that the cover member moves between a closed position for covering the second discharge portion and an open position for exposing the second discharge portion.

According to another embodiment of the invention, an image scanning device comprises a scanning unit configured to scan, at a scanning position, an image of a document, a first discharge portion, a second discharge portion, a conveying unit configured to selectively convey the document along a first conveying path from the scanning position to the first discharge portion, and along a second conveying path from the scanning position to the second discharge portion, and a driving unit configured to generate a driving force for driving the conveying unit. The second discharge portion comprises a discharge tray configured to receive the driving force generated by the driving unit and to move between an extended position for receiving the document conveyed to the second discharge portion and a retracted position which is retracted from the extended position.

Other objects, features, and advantages will be apparent to persons of ordinary skill in the art from the following detailed description of the invention and the accompanying drawings.

BRIEF DESCRIPTION OF THE DRAWINGS

For a more complete understanding of the invention, the needs satisfied thereby, and the features and technical advantages thereof, reference now is made to the following descriptions taken in connection with the accompanying drawings.

DETAILED DESCRIPTION OF EMBODIMENTS

Embodiments of the invention and their features and technical advantages may be understood by referring to FIGS. 1-9, like numerals being used for like corresponding parts in the various drawings.

An image scanning device according to an embodiment of the invention may be a multi-function device having a scanning function and other functions, e.g., printing, copying, and facsimile transmitting/receiving functions. In the following description, the directions "top", "bottom", "left", "right", "front", and "rear" are used to clarify the positional relationship of various parts of the multi-function device.

As shown in FIGS. 1A, 1B, 2A, and 2B, a multi-function device 1 comprises a main unit 2, a scanning unit 3 mounted on the main unit 2, and a document conveying unit 4 mounted on the scanning unit 3.

The main unit 2 comprises therein an image forming unit, a control unit, and a power supply unit. The control unit of the main unit 2 controls various mechanisms of the main unit 2, the scanning unit 3, and the document conveying unit 4.

The scanning unit 3 is configured to pivot relative to the main unit 2 about an axis located in the vicinity of rear ends of the main unit 2 and the scanning unit 3 and extending in a left-right direction. The scanning unit 3 pivots between a closed position (shown in FIG. 1A) and an open position (shown in FIG. 2B).

When the scanning unit 3 is in the open position, a first opening 2A defined at the top of the main unit 2 is open to allow maintenance work of the various parts, e.g., the image forming unit, the control unit, and the power supply unit. When the scanning unit 3 is in the closed position, the first opening 2A is closed.

The document conveying unit 4 is configured to pivot relative to the scanning unit 3 about an axis located near rear ends of the scanning unit 3 and the document conveying unit 4 and extending in the left-right direction. The document conveying unit 4 pivots between a closed position (shown in FIG. 1A) and an open position (shown in FIG. 2A).

When the document conveying unit 4 is in the open position, a document holding surface (a transparent portion 25 for a stationary document) is exposed. The document conveying unit 4 located in the open position functions as a cover that covers the document holding surface.

A cover member 5 is attached to a left end of the document conveying unit 4. The cover member 5 is configured to pivot relative to the document conveying unit 4 about an axis located in the vicinity of a left end of the document conveying unit and a lower end of the cover member 5. The cover member 5 pivots between a closed position (shown in FIG. 1A) and an open position (shown in FIG. 1B).

When the cover member 5 is in the open position, a second opening 4A is exposed. When the cover member 5 is in the closed position, the second opening 4A is covered. As will be described below, when a document is conveyed along a second conveying path, the second opening 4A is used as a discharge port through which the document is discharged. In other words, the cover member 5 is configured to move between an extended position (shown in FIG. 4B) for receiving the document discharged through the second opening 4A and a retracted position (shown in FIG. 4A) which is retracted from the extended position.

An operation panel 7 is disposed at a front top of the main unit 2 so as to be operated by a user. A discharge port 8 is formed below the operation panel 7 such that a recording medium having an image printed thereon is discharged through the discharge port 8. A cassette 9 configured to store blank recording media is mounted below the discharge port 8.

Figure 1A:
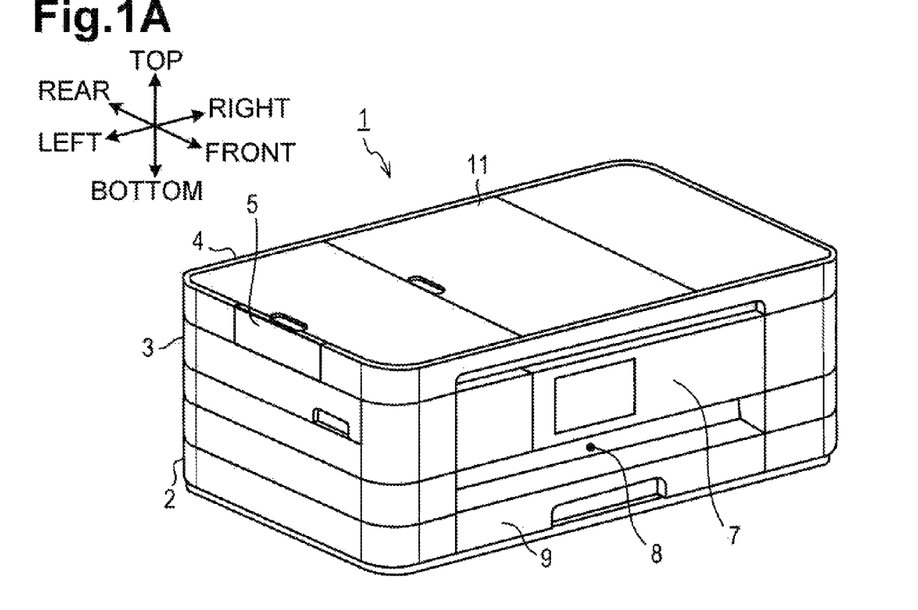
FIG. 1A is a perspective view of a multi-function device in a first open/closed state, according to an embodiment of the invention.
Figure 1B:
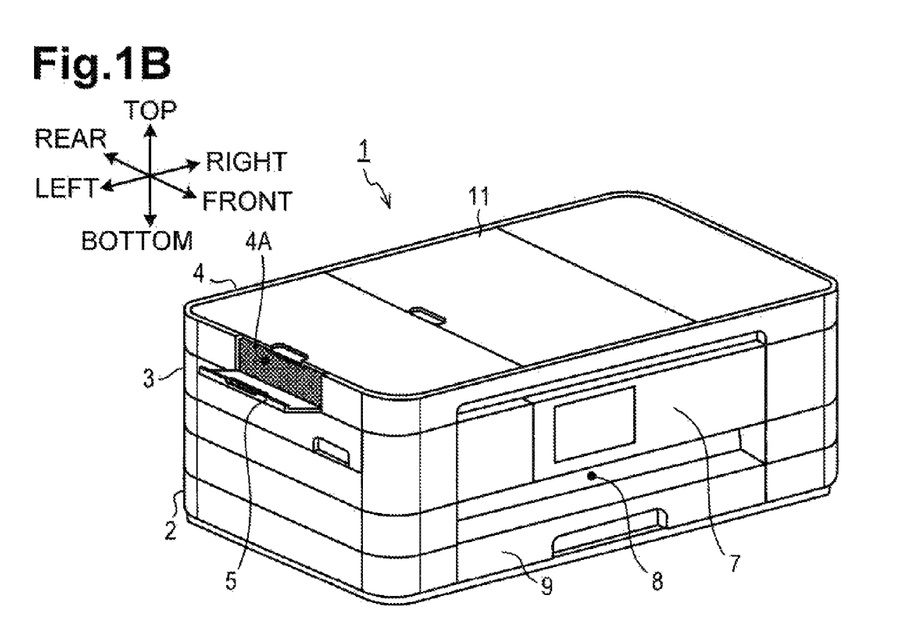
FIG. 1B is a perspective view of the multi-function device in a second open/closed state.
Figure 2A:
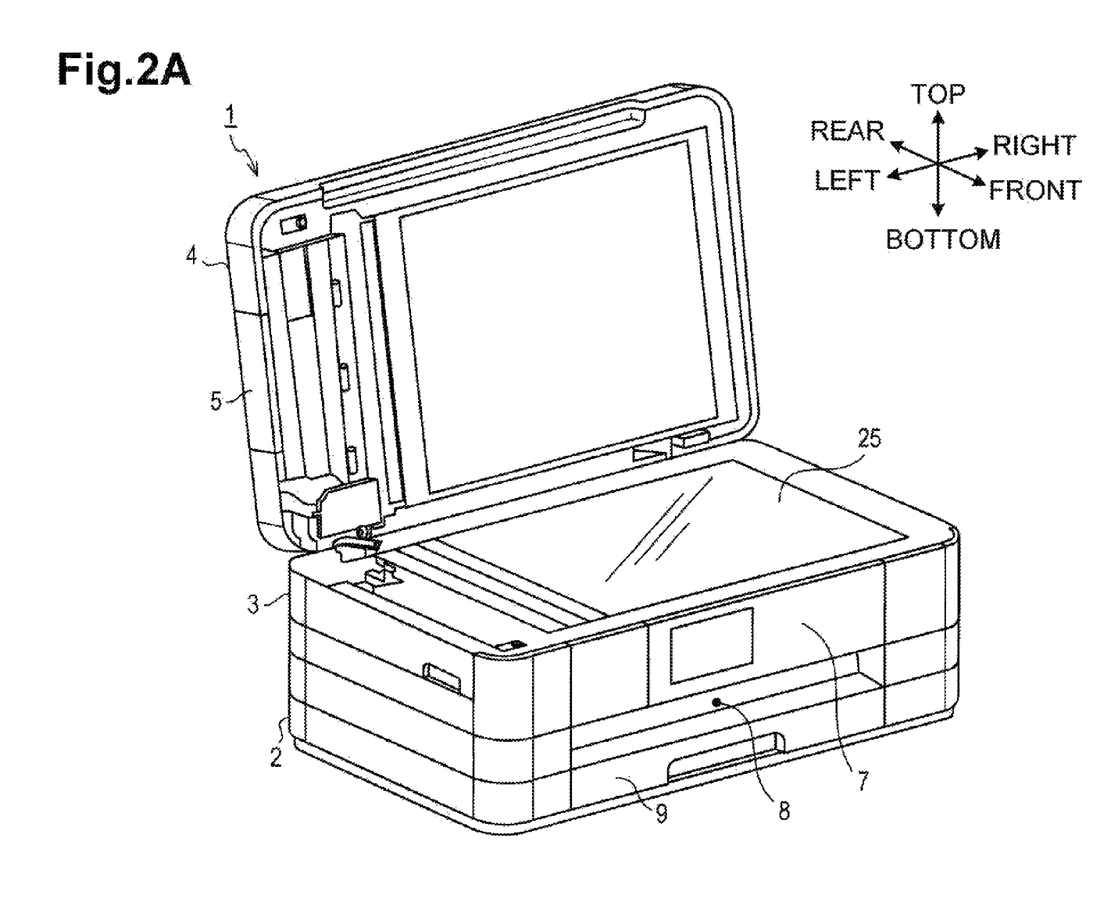
FIG. 2A is a perspective view of the multi-function device in a third open/closed state.
Figure 2B:
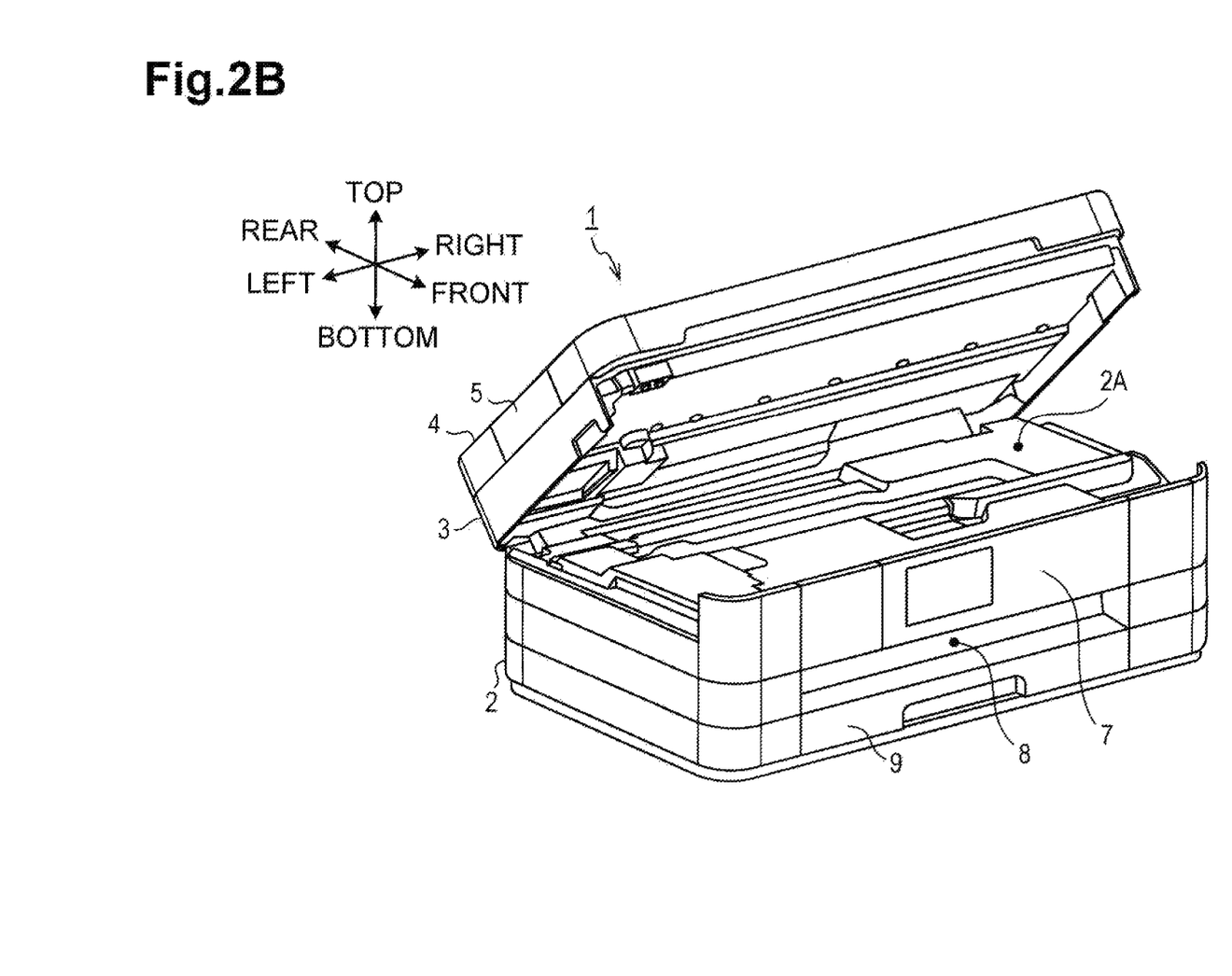
FIG. 2B is a perspective view of the multi-function device in a fourth open/closed state.
Figure 3A:
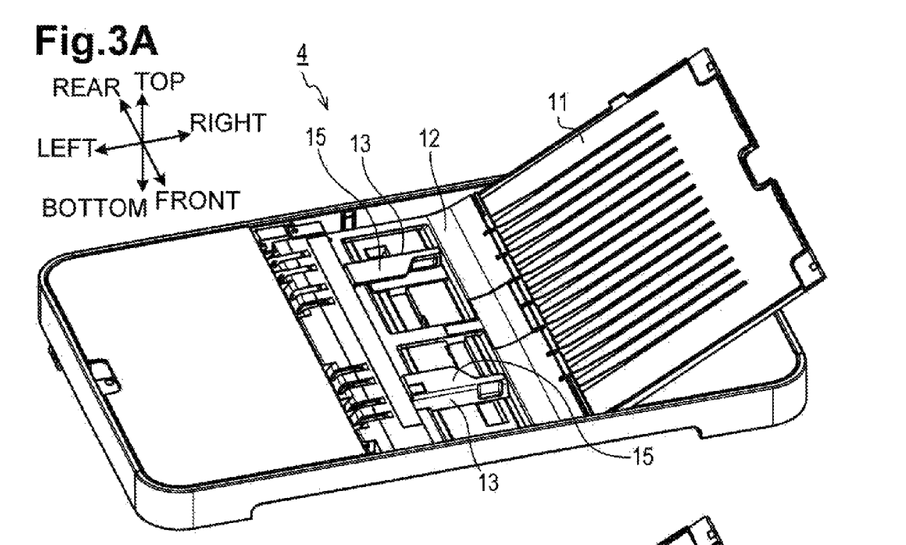
FIG. 3A is a perspective view of a document conveying unit in which a top cover thereof is open.

As shown in FIGS. 1A and 1B, an openable top cover 11 is disposed at the top of the document conveying unit 4. As shown in FIG. 3A, the top cover 11 is configured to pivot relative to the document conveying unit 4 about an axis located in the vicinity of a right end of the top cover 11 and extending in a front-rear direction. The top cover 11 pivots between a closed position (shown in FIG. 1A) and an open position (shown in FIG. 3A).

The top cover 11 extends substantially horizontally when the top cover 11 is in the closed position and extends obliquely right upward when the top cover 11 is in the open position. When the top cover 11 moves to the open position, a document tray 12 is exposed at the top of the document conveying unit 4.

Document guides 13 are disposed on the document tray 12. The document guides 13 are configured to slide along the front-rear direction such that when one of the documents guides 13 slides in one direction, the other slides in an opposite direction. By operating only one of the document guides 13, the document guides 13 slide close to or away from each other thereby changing a distance between the document guides 13.

A partition plate 14 is disposed at a top end of each document guide 13. Documents to be fed are set below the partition plates 15. As will be described below, when documents are conveyed along a first conveying path, the documents are discharged on the partition plates 15.

Figure 3B:
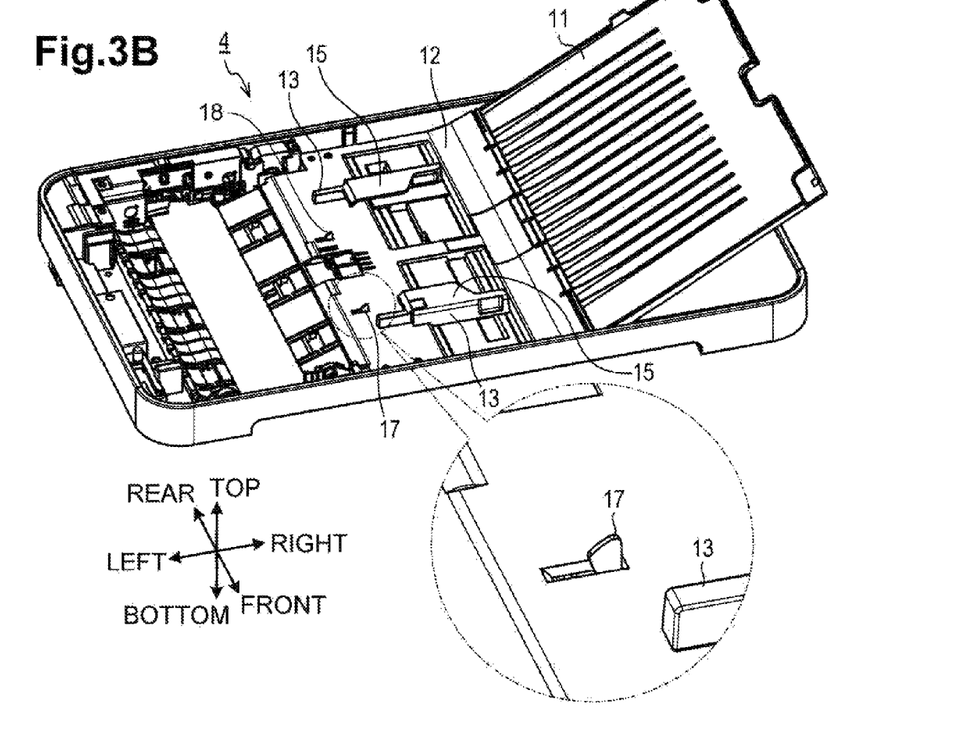
FIG. 3B is a perspective view of the document conveying unit comprising a document sensor.

As shown in FIG. 3B, the document tray 12 comprises document sensors 17, 18. The document sensor 17 is a contact-type sensor and turns on/off by being pushed down by a document set in the document tray 12. The document sensor 17 is disposed at such a position that a document larger than a predetermined size (e.g., a postcard size), when set in the document tray 12, pushes down the document sensor 17. Thus, when a document (e.g., a postcard or a business card) smaller than or equal to the predetermined size is set in the document tray 12, the document sensor 17 is not pushed down and thereby detects whether the set document is smaller than or equal to the predetermined size. The document sensor 18, which is the same type as the document sensor 17, is disposed at such a position that a document either larger or smaller than the predetermined size, when set in the document tray 12, pushes down the document sensor 18.

Figure 4A:
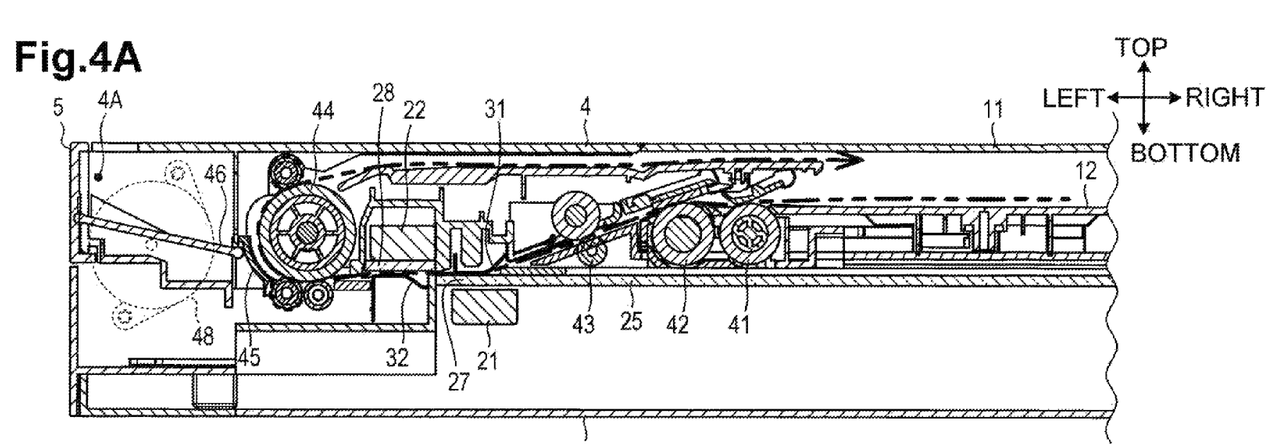
FIG. 4A is a vertical cross-sectional view of the multi-function device comprising a scanning unit and the document conveying unit, as viewed from the front when a cover member is closed.
Figure 4B:
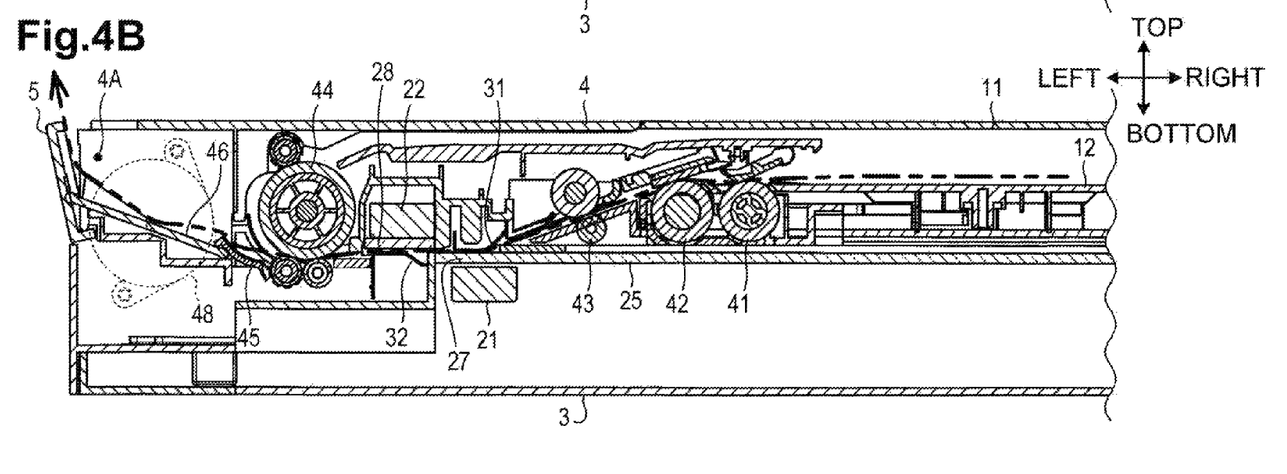
FIG. 4B is a vertical cross-sectional view off the multi-function device comprising the scanning unit and the document conveying unit, as viewed from the front when the cover member is open.

As shown in FIGS. 4A and 4B, the scanning unit 3 comprises a first image sensor 21, and the document conveying unit 4 comprises a second image sensor 22. In this embodiment, each of the first image sensor 21 and the second image sensor 22 is a contact image sensor.

The first image sensor 21 is driven by a motor (not shown) to reciprocate inside the scanning unit 3 in the left-right direction (sub-scanning direction). The second image sensor 22 is fixed to a frame inside the document conveying unit 4.

The scanning unit 3 comprises a transparent portion 25 for a stationary document and a first transparent portion 27 for a moving document that are disposed above a reciprocating path of the first image sensor 21. The document conveying unit 4 comprises a second transparent portion 28 disposed below the second image sensor 22.

The transparent portion 25 and the first transparent portion 27 define a top surface of the scanning unit 3 and are formed by a single glass plate in this embodiment. The second transparent portion 28 is formed by a separate glass plate from the single glass plate having the transparent portion 25 and the first transparent portion 27.

The transparent portion 25 and the first transparent portion 27 may be formed by separate glass plates. The transparent portion 25, the first transparent portion 27, and the second transparent portion 28 may be made of other materials than glass as long as the material is transparent and allows the first image sensor 21 and the second image sensor 22 to scan a document therethrough.

The document conveying unit 4 comprises a first document retainer 31 disposed above the first transparent portion 27. The scanning unit 3 comprises a second document retainer 32 disposed below the second transparent portion 28.

The first document retainer 31 is urged downward by a compressed spring (not shown) so as to slightly press an upper surface of the first transparent portion 27. The second retainer 32 is urged upward by a compressed spring (not shown) so as to slightly press a lower surface of the second transparent portion 28.

The document conveying unit 4 comprises rollers, e.g., a feed roller 41, a separation roller 42, a registration roller 43, and a U-turn roller 44, and guide members disposed between these rollers and having guide surfaces for guiding a document in a predetermined direction. As one of the guide members, a movable path switching member 45 is disposed leftward of the U-turn roller 44.

The path switching member 45 is configured to pivot relative to the document conveying unit 4 about an axis located at a lower end of the path switching member 45 and extending in the front-rear direction. The path switching member 45 pivots between a first position shown in FIG. 4A and a second position shown in a second position shown in FIG. 4B.

A link member 46 is disposed between the path switching member 45 and the cover member 5. The link member 46 is pivotably coupled, at a right end thereof, to the path switching member 45 and is pivotably coupled, at a left end thereof, to the cover member 5. Each of the cover member 45 and the path switching member 45 is configured to pivot, at a lower end thereof, relative to the document conveying unit 4. A four-joint link is formed in the document conveying unit 4 by the cover member 5, the path switching member 45, and the link member 46.

Because of this four-joint link, the path switching member 45 moves to the second position as the cover member 5 is opened 5, and moves to the first position as the cover member 5 is closed. As will be described in detail below, in this embodiment, the cover member 5 comprises a motor-driven mechanism for opening/closing the cover member 5, and the path switching member 45 moves as the cover member 5 is opened/closed by the motor-driven mechanism.

Figures 5A, 5B:
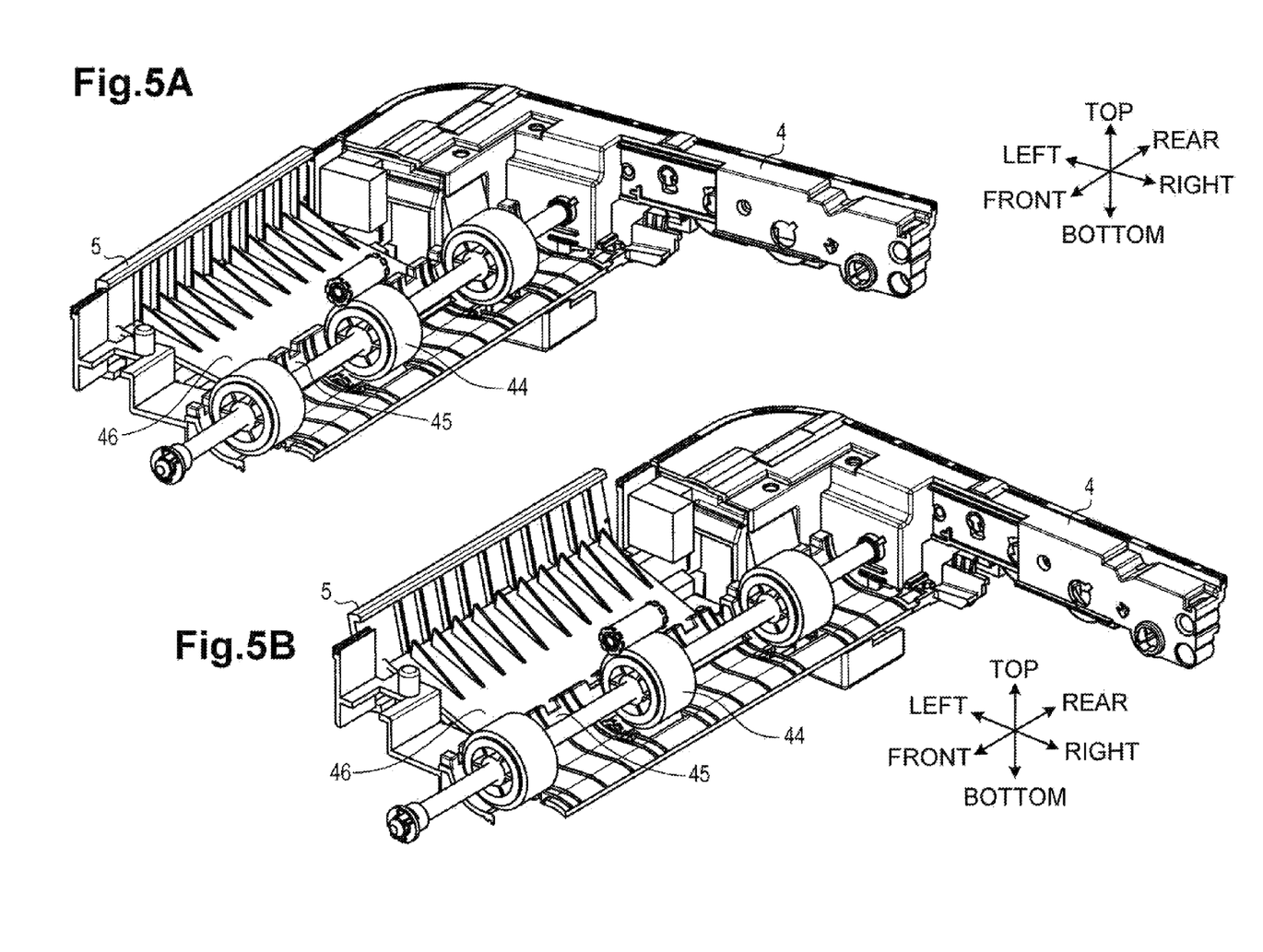
FIG. 5A is a perspective view of a path switching member and a link member when the cover member is closed.
FIG. 5B is a perspective view of the path switching member and the link member when the cover member is open.

As shown in FIGS. 5A and 5B, each of the path switching member 45 and the link member 46 has an upper surface which serves as a guide surface for guiding a document. The guide surface is formed by ribs to reduce friction between the path switching member 45 and the document. The path switching member 45 and the link member 46 have a width in the front-rear direction that is slightly smaller than that of the cover member 5 and is suitable for conveying documents smaller than or equal to a postcard.

Figure 6:
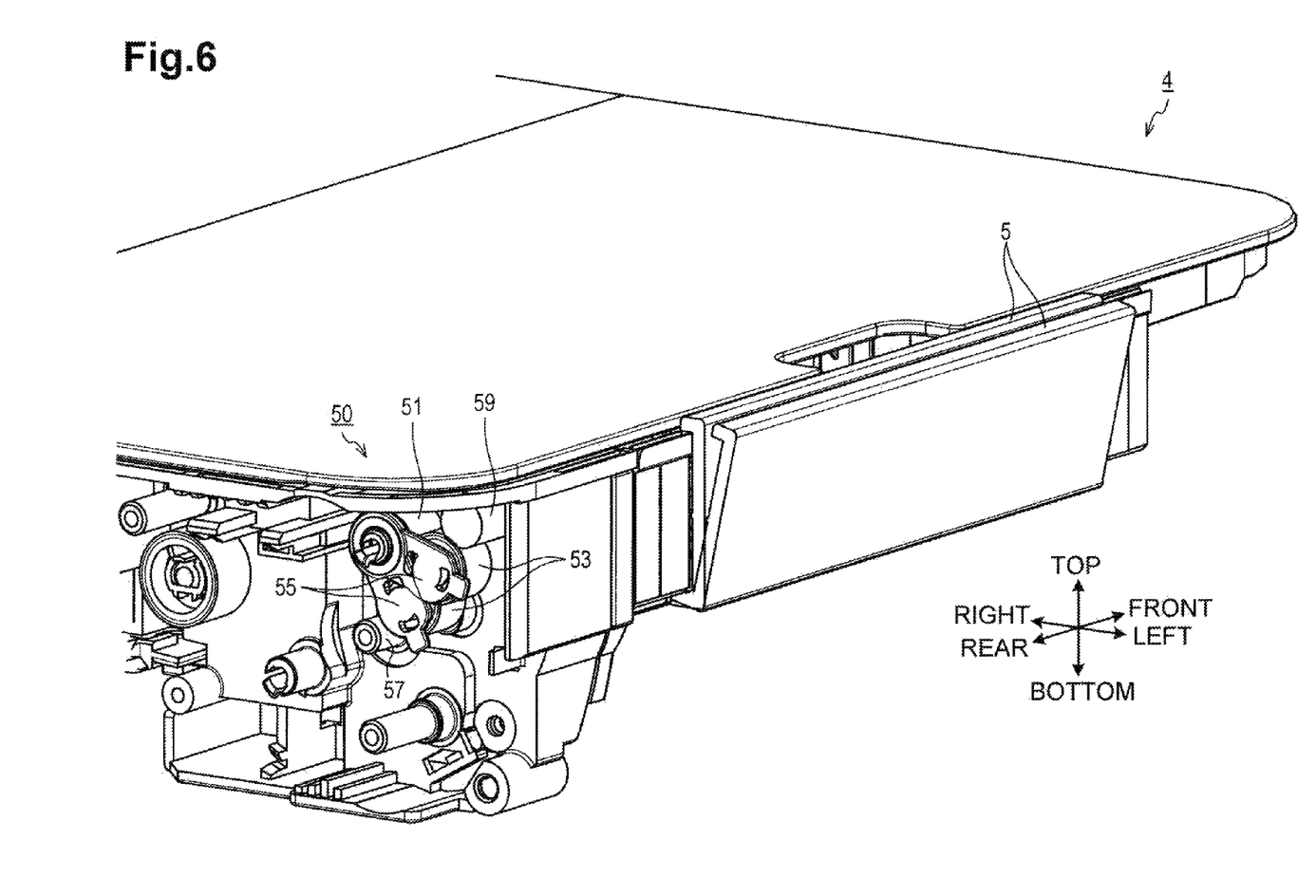
FIG. 6 is a perspective view of a drive transmitting mechanism disposed in the vicinity of a rear left end of the document conveying unit.

As shown in FIGS. 4A and 4B, a motor 48 is disposed behind the link member 46, and a drive transmitting mechanism 50 shown in FIG. 6 is disposed behind the motor 48 and in the vicinity of a rear left end of the document conveying unit 4. The drive transmitting mechanism 50 comprises a motor gear 51 which is driven by the motor 48 to rotate, and a planet gear 53 which is driven by a driving force transmitted from the motor gear 51. The planet gear 53 is attached to a support member 55 which oscillates between two positions which will be described below. FIG. 6 shows at the same time the planet gear 53 moved to one of the two positions and moved to the other of the two positions. The drive transmitting mechanism 50 is an example of a drive transmitting unit.

When the motor gear 51 is driven by the motor 48 to rotate in a first direction, e.g., in a forward direction, the planet gear 53 and the support member 55 move to a lower position such that the planet gear 53 engages an ADF drive gear 57. In this state, the motor gear 51 rotating in the forward direction drives a document conveying mechanism (e.g., the feed roller 41, the separation roller 42, the registration roller 43, and the U-turn roller 44).

When the motor gear 51 is driven by the motor 48 to rotate in a second direction, e.g., in a reverse direction, the planet gear 53 and the support member 55 move to an upper position such that the planet gear 53 engages a drive transmitting gear 59 for transmitting a driving force to open/close the cover member 5. In this state, the motor gear 51 rotating in the reverse direction drives the drive transmitting gear 59.

Figure 7:
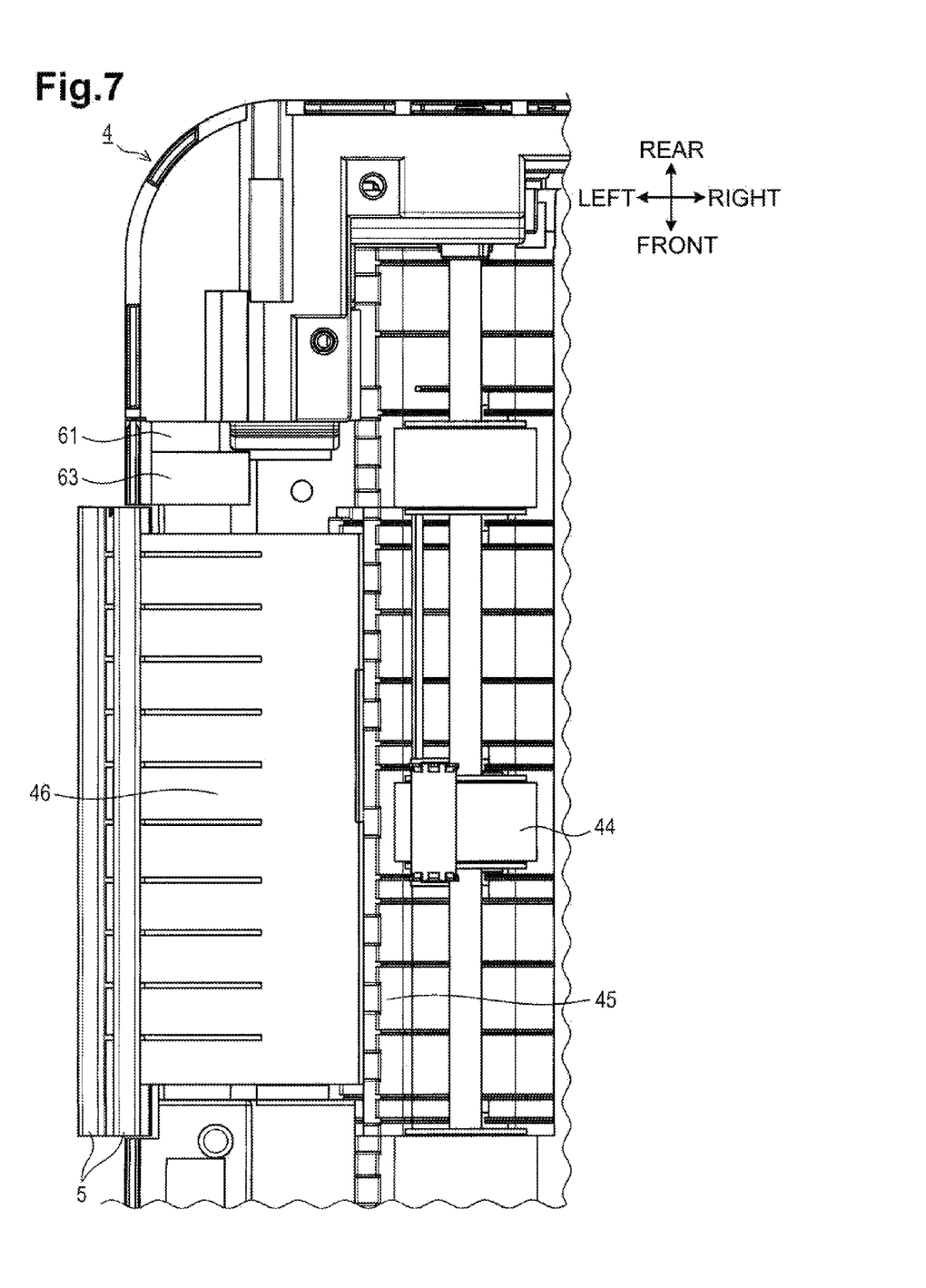
FIG. 7 is a plan view showing a position of a gear mechanism for opening/closing the cover member and a position of a 4-joint link for opening/closing the cover member.

As shown in FIG. 7, the drive transmitting gear 59 is a part of a gear mechanism 61 for opening/closing the cover member 5, and a motion of the drive transmitting gear 59 is transmitted, via the gear mechanism 61, to a four-joint link 63 for opening/closing the cover member 5.

Figure 8:
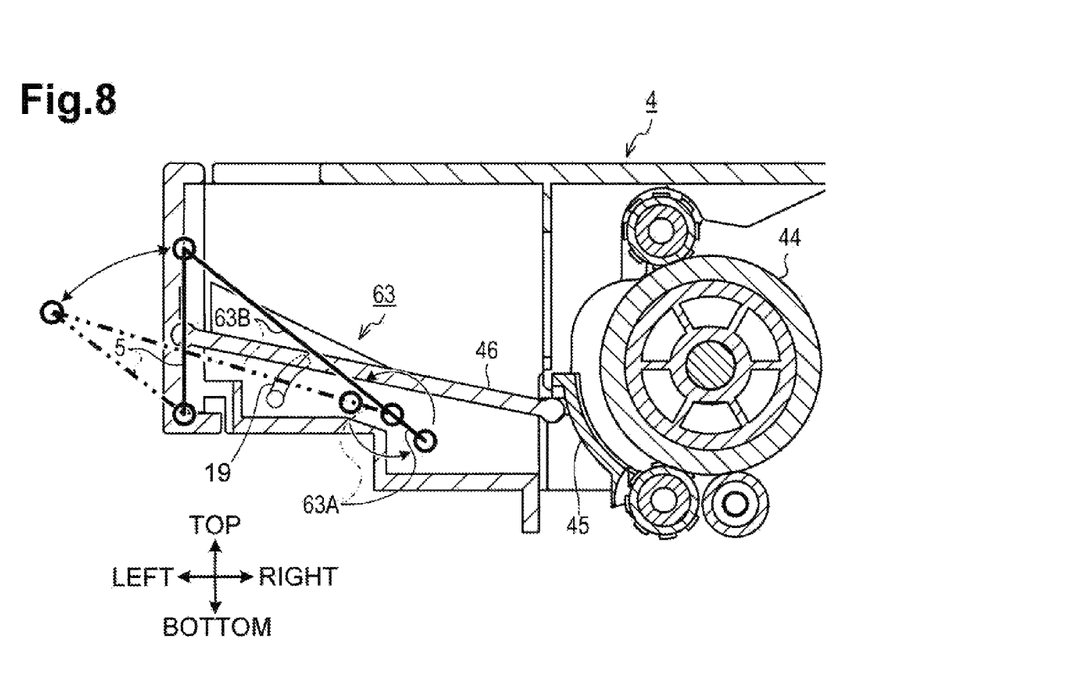
FIG. 8 is a schematic view showing a general structure of the four-joint link for opening/closing the cover member.

As shown in FIG. 8, the four-joint link 63 is a drive transmitting mechanism comprising a first link element 63A and a second link element 63B, and configured to convert a unidirectional rotating motion of the first link element 63A to a reciprocating motion of the cover member 5. In this four-joint link 63, the first link element 63A is rotatably coupled to a frame of the document conveying unit 4 and is driven, by a driving force transmitted via the gear mechanism 61, to rotate in a direction shown by an arrow in FIG. 8. The second link element 63B is pivotably coupled, at one end thereof, to the first link element 63A and is pivotably coupled, at the other end thereof, to the cover member 5. The second link element 63B follows the rotation of the first link element 63A and moves to an initial position (shown by a solid line in FIG. 8) and an operating position (shown by a two-dot-one-dash line in FIG. 8). As the second link element 63B moves, the cover member 5 pivots and reciprocates between a closed position (shown by a solid line in FIG. 8) and an open position (shown by a two-dot-one-dash line in FIG. 8).

The above-described motion of the four-joint link 63 will be described further in detail referring to FIGS. 9A to 9E. The first link element 63A is rotatably coupled at a joint P1 to the frame (not shown) of the document conveying unit 4 and is pivotably coupled at a joint P2 to the second link element 63B.

The joint P1 is a rotation center of the fist link element 63A. When the first link element 63A is driven to rotate, the joint P2, which is distant from the joint P1 by a predetermined distance, moves to such positions as to draw a circular locus around the joint P.

The second link element 63B is pivotably coupled at the joint P2 to the first link element 63A and is pivotably coupled at the joint P3 to the cover member 5. When the joint P2 moves as the first link element 63A rotates, the second link element 63B transmits the motion of the joint P2 to the cover member 5 and moves the cover member 5 to such a position that the predetermined distance is maintained between the joint P2 and the joint P3.

The cover member 5 is pivotably coupled at a joint P3 to the second link element 63B and is pivotably coupled at a joint P4 to the frame (not shown) of the document conveying unit 4. The joint P4 is a pivoting center of the cover member 5, and the joint P3, which is distant from the joint P4 by a predetermined distance, moves to such positions as to draw an arcuate locus around the joint P4.

Figures 9A, 9B:
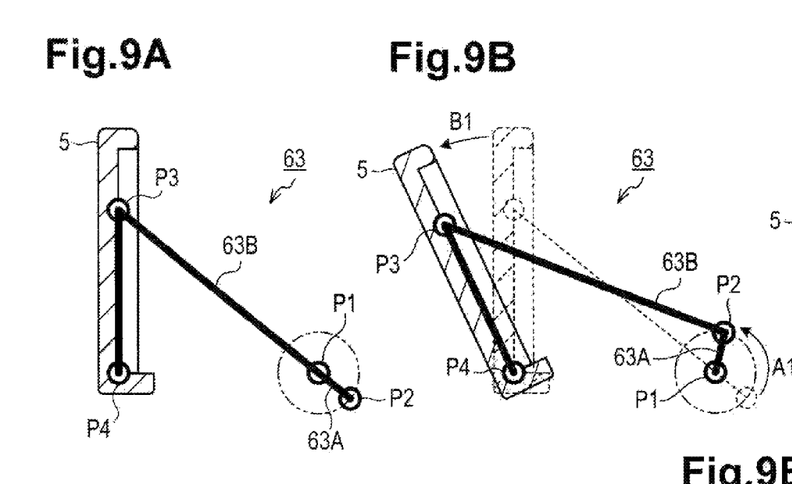
FIGS. 9A-9E are schematic diagrams showing, in a step-by-step manner, motions of the four-joint link for opening/closing the cover member.
Figure 9C:
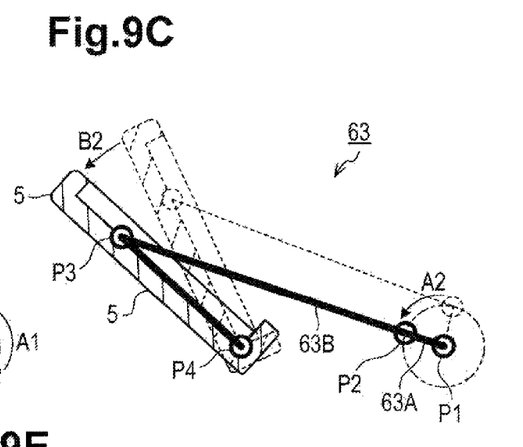

The first link element 63A and the second link element 63B overlap in FIG. 9A and are aligned in a line in FIG. 9C. Although, in FIGS. 8 and 9A to 9D, the first link element 63A and the second link element 63B are shown as linear, these link elements may not be linear.

The first link element 63A and the second link elements 63B are initially located in initial positions shown in FIG. 9A (shown by a solid line in FIG. 8). At this time, the cover member 5 is in the closed position shown in FIG. 9A (shown by a solid line in FIG. 8). In this state, when the driving force is transmitted by the gear mechanism 61 to the first link element 63A, the first link element 63A is driven to rotate in a direction shown by an arrow A1 in FIG. 9B.

When the first link element 63A is driven to rotate in the direction shown by the arrow A1, the joint P2 tries to move in a direction toward the joint P3. However, because the predetermined distance is maintained between the joint P2 and the joint P3 by the second link element 63B, the joint P3 moves as the joint P2 moves. Because the joint P3 moves about the joint P4, the cover member 5 pivots about the joint P4 in a direction shown by an arrow B1 in FIG. 9B.

When the first link element 63A is driven to rotate further in a direction shown by an arrow A2 in FIG. 9C, the joint P2 still tries to move in a direction toward the joint P3. However, as described above, the joint P3 moves about the joint P4 as the joint P2 moves. Thus, the cover member 5 pivots further about the joint P4 in a direction shown by an arrow B2 in FIG. 9C to the open position shown in FIG. 9C (shown by a two-dot-one-dash line in FIG. 8).

Figure 9D:
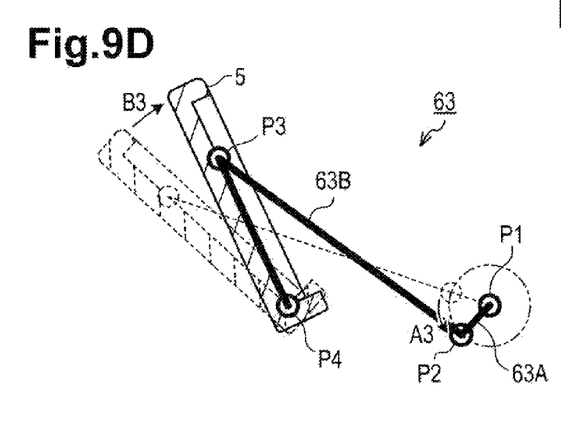
Figure 9E:
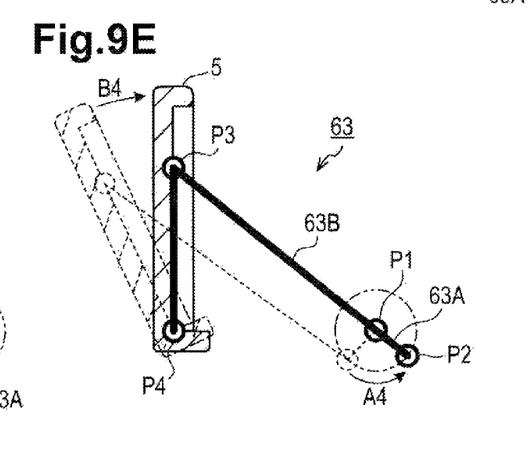

After that, when the first link element 63A is driven to rotate in a direction shown by an arrow A3 in FIG. 9D, the joint P2 tries to move in a direction away from the joint P3. However, as described above, because the predetermined distance is maintained between the joint P2 and the joint P3 by the second link element 63B, the joint P3 moves as the joint P2 moves. The joint P3 moves about the joint P4. Thus, the cover member 5 pivots about the joint P4 in a direction shown by an arrow B3 in FIG. 9D.

When the first link element 63A is driven to rotate further in a direction shown by an arrow A4 in FIG. 9C, the joint P2 still tries to move in a direction away from the joint P3. However, as described above, the joint P3 moves about the joint P4 as the joint P2 moves. Thus, the cover member 5 pivots further about the joint P4 in a direction shown by an arrow B4 in FIG. 9E and returns to the closed position shown in FIG. 9E (shown by a solid line in FIG. 8).

In short, when the first link element 63A rotates once in the directions shown by the arrows A1 to A4 in FIGS. 9A to 9E, the first link element 63A and the second link element 63B move step by step as shown in FIGS. 9A to 9E from the initial positions to the operating positions and return to the initial positions. In this case, the cover member 5 opens and closes while following the motions of the first link element 63A and the second link element 63B.

When the motor gear 51 is driven to rotate in the reverse direction, the gear mechanism 61 for opening/closing the cover member 5 transmits the rotation of the motor gear 51 to the first link element 63A while reducing the number of rotations of the motor gear 51 at a predetermined reduction rate. For example, a sensor for detecting the initial position (shown in FIG. 9A) of the first link element 63A, which corresponds to the closed position of the cover member 5, may be provided, and the motor gear 51 may be controlled to rotate a predetermined angle such that the first link element 63A rotates from the initial position (shown in FIG. 9A) to the operation position (shown in FIG. 9C) which corresponds to the open position of the cover member 5. By this control, the cover member 5 may be stopped at the open position.

As described above, in addition to the four-joint link 63, another four-joint member is formed by the cover member 5, the path switching member 45, and the link member 46. Thus, when the four-joint link 63 opens/closes the cover member 5, the path switching member 45 and the link member 46 moves in response to the opening/closing of the cover member 5.

When the motor gear 51 is controlled to rotate by a predetermine amount, the cover member 5, the path switching member 45, and the link member 46 move in response to each other. The cover member 5 moves to the closed position when the path switching member 45 moves to the first position to partially define the first conveying path (as shown in FIG. 4A), and moves to the open position when the path switching member 45 moves to the second position to partially define the second conveying path (as shown in FIG. 4B).

The multi-function device 1 having the above-described structure is configured to scan an image on a document while conveying the document by the document conveying unit 4. In order for the multi-function device 1 to scan a document, a document to be fed is set in the document tray 12. Specifically, the distance between the document guides 13 are adjusted by sliding the document guides 13 in the front-rear direction according to the size of the document. Then, the document is set between the document guides 13.

In this embodiment, when the document which is relatively large (larger than a postcard size) is set in the document tray 12, the document pushes the document sensor 17. When the document (e.g. a postcard or a business card) which is relatively small (smaller than or equal to a postcard size) is set in the document tray 12, the document does not push the document sensor 17. In this way, the document sensor 17 detects whether or not the size of the document in a width direction is greater than a predetermined threshold value. The width direction is perpendicular to a conveying direction of the document and a thickness direction of the document.

When the document sensor 17 detects that the size of the document in the width direction is greater than the predetermined threshold value, the cover member 5, the path switching member 45, and the link member 46 remain in the initial positions, and the first conveying path (shown by a two-dot-one-dash line in FIG. 4A) is defined in the document conveying unit 4.

When the document sensor 17 detects that the size of the document in the width direction is not greater than the predetermined threshold value, the motor gear 51 is driven to rotate in the reverse direction, and the cover member 5 moves to the open position. The path switching member 45 and the link member 46 move while following the motion of the cover member 5, and the second conveying path (shown by a two-dot-one-dash line in FIG. 4B) is defined in the document conveying unit 4.

Subsequently, a scanning command is input to the multi-function device 1 through the operation panel 7 or remotely from a personal computer (not shown). At this time, either a single-side scanning mode or a double-side scanning mode is selectively designated. Upon receipt of the scanning command, the multi-function device 1 executes initialization of each device and then drives the motor gear 51 in the forward direction to activate the rollers of the document conveying unit 4. At this time, the feed roller 41 feeds documents from an upstream side in a conveying direction, and the separation roller 42 separates and conveys the documents one by one toward a downstream side in the conveying direction.

A leading edge of the separated document abuts against the registration roller 43 such that the leading edge of the document is registered and skew of the document is corrected. The document is fed toward the downstream side in the conveying direction and passes between the first transparent portion 27 and the first document retainer 31. When the double-side scanning mode is designated or when the single-side scanning mode by the first image sensor 21 is designated, the first image sensor 21 scans an image of the document that reaches a position facing the first image sensor 21.

Specifically, the first image sensor 21 scans, at a scanning position, an image of a front side of the document by repeatedly scanning a plurality of pixels arranged on the document in a main scanning direction parallel to the front-rear direction of the multifunction device while the document moves in a sub-scanning direction parallel to the conveying direction.

The document having passed between the first transparent member 27 and the first document retainer 31 passes between the second transparent portion 28 and the second document retainer 32. When the double-side scanning mode is designated or when the single-side scanning mode by the second image sensor 22 is designated, the second image sensor 22 scans an image of the document that reaches a position facing the second image sensor 22.

Specifically, the second image sensor 22 scans, at a scanning position, an image of a back side of the document by repeatedly scanning a plurality of pixels arranged on the document in the main scanning direction while the document moves in the sub-scanning direction.

The document having passed between the second transparent portion 28 and the second document retainer 32 reaches the U-turn roller 44 and is conveyed leftward from a lower end of the U-turn roller 44. After the document is scanned at the scanning position by the first image sensor 21 or the second image sensor 22, the U-turn roller 44 conveys the document along the first conveying path to a first discharge portion, e.g., the upper side of the partition plates 15, or along the second conveying path to a second discharge portion, e.g., the second opening 4A.

When the first conveying path is selected (as shown in FIG. 4A) as the document conveying path, the path switching member 45 serves as a partition wall that defines a space each on right and left sides of the path switching member 45. In this state, a concave right surface of the path switching member 45 is located along an outer circumferential surface of the U-turn roller 44 and serves as a guide surface that guides upward a leading edge of the document conveyed leftward from the lower end of the U-turn roller 44.

The document is conveyed along the first conveying path while being guided upward along the guide surface and making a U-turn along the U-turn roller 44. The document conveyed along the first conveying path is discharged onto the top of the document conveying unit 4, i.e., the upper sides of the partition plates 15.

When the second conveying path is selected (as shown in FIG. 4B) as the document conveying path, the path switching member 45 pivots leftward about a lower end thereof such that the right and left spaces of the path switching member 45 communicate with each other. In this state, a leading edge of the document conveyed leftward from the lower end of the U-turn roller 44 passes over an upper end of the path switching member 45. The width of the communicating spaces in the front-rear direction may be set such that the document having a predetermined size (e.g., a postcard size) passes along the second conveying path.

Consequently, the document is conveyed toward the link member 46 along the second conveying path. Then, the document is discharged from the second opening 4A formed at a left end of the document conveying unit 4 and is supported from left and below by the cover member 5 that serves as a discharge tray. As shown in FIG. 8, a document sensor 19 is disposed in the vicinity of the link member 46. The document sensor 19, which is a contact-type sensor, projects beyond an upper surface of the link member 46 through a hole formed in the link member 46 when the cover member 5 is in the open position. The document sensor 19 is pushed down by the document discharged along the link member 46 onto the cover member 5.

After the document is conveyed along the second conveying path, when the document sensor 18 detects that no document to be conveyed is in the document tray 12 and when the document sensor 19 detects that no document is left on the cover member 5, the motor gear 51 is driven to rotate in the reverse direction thereby to return the cover member 5 to the closed position. The path switching member 45 and the link member 46 are actuated to follow the motion of the cover member 5. Consequently, the first conveying path (shown by a two-dot-one-dash line in FIG. 4A) is defined again in the document conveying unit 4. Each of the document sensors 18 and 19 is an example of a document detecting unit.

Further, the multi-function device 1 is configured to scan a stationary document placed on the transparent portion 25. In this case, the document conveying unit 4 is opened and a document is placed on a document holding surface, e.g., the transparent portion 25. In this state, a scanning command is input to the multi-function device 1 through the operation panel 7 or remotely from the personal computer.

When a scanning command is input to the multi-function device 1, the multi-function device 1 executes initialization of each device and then the first image sensor 2 scans an image of the document. Specifically, the first image sensor 1 scans an image of the document placed on the transparent portion 25 by repeatedly scan a plurality of pixels arranged on the document in the main scanning direction while moving in the sub-scanning direction.

As described above, in the multi-function device 1, the cover member 5 moves to the closed position to close the second opening 4A when the document conveying unit 4 conveys the document along the first conveying path, and moves to the open position to open the second opening 4A when the document conveying unit 4 conveys the document along the second conveying path. The document conveying unit 4 is an example of a conveying unit.

Accordingly, when the second conveying path is used, a cumbersome operation for moving the cover member 5 to open position is avoided, and there is no chance for the document conveying unit 4 to convey the sheet with the cover member 5 closed. When the first conveying path is used, there is no chance for the cover member 5 to move to the open position unnecessarily.

In order to operate the cover member 5, the driving force for driving the cover member 5 is transmitted from the motor 48 via the motor gear 45. The motor 48 serves also as a driving unit for driving the document conveying mechanism (e.g., the feed roller 41, the separation roller 42, the registration roller 43, and the U-turn roller 44).

Thus, there is no need to provide driving units separately for the cover member 5 and the document conveying mechanism. As compared to the case where separate driving units are provided, the total number of driving units can be reduced, and the device size is reduced by saving the space for the driving units. Further, the manufacturing cost can be reduced because the parts cost and the assembly man-hour can be reduced in correspondence to the reduced driving units.

As described above, in the multi-function device 1, the path switching member 45 is actuated based on a type of document (whether or not the document is larger than a postcard) detected by the document sensor 17, and moves between the first position for guiding the document along the first conveying path and the second position for guiding the document along the second conveying path. The path switching member 45 is an example of a path switching unit. The document sensor 17 is an example of a document type obtaining unit, and the document conveying unit 4 is an example of a conveying unit.

Thus, the conveying path suitable for the type of document can be used selectively. The first conveying path is used for a type of document which is suitable for being bent, and the second conveying path is used for a type of document which is not suitable for being bent.

In order to operate the path switching member 45, the driving force of the motor 48 for driving the path switching member 45 is transmitted from the motor gear 51. The motor 48 serves also as a driving unit for driving the document conveying mechanism (e.g., the feed roller 41, the separation roller 42, the registration roller 43, and the U-turn roller 44).

Thus, there is no need to provide driving units separately for the path switching member 45 and the document conveying mechanism. As compared to the case where separate driving units are provided, the total number of driving units can be reduced, and the device size is reduced by saving the space for the driving units. Further, the manufacturing cost can be reduced because the parts cost and the assembly man-hour can be reduced in correspondence to the reduced driving units.

Further, in the above-described multi-function device 1, the document sensor 17 detects a size of the document in a width direction when the document is placed on the document tray 12, and the path switching member 45 is actuated based on the detected size which corresponds to a predetermined type of document. Thus, the path switching member 45 is actuated readily without complicated operations.

Although, in the above-described embodiment, the cover member 5, the path switching member 45, and the link member 46 move in response to each other, the path switching member 45 may be configured to move independently. The path switching member 45 may be manually operated, or may be motor-driven separately from the motion of the cover member 5.

Although, in the above-described embodiment, whether to move the cover member 5 to the open position or the closed position is determined based on the document size detected by the document sensor 17, the cover member 5 may be configured to move between the open position and the closed position irrespective of the document size. The cover member 5 may be configured to move between the open position and the closed position based on input from the operation panel 7 of, for example, a document type.

In the above-described embodiment, the motor gear 51 is driven to rotate in the reverse direction to return the cover member 5 to the closed position when the document sensor 18 detects no document in the document tray 12 and when the document sensor 19 detects no document on the cover member 5 after the document is conveyed along the second conveying path. Consequently, the path switching member 45 and the link member 46 move in response to the motion of the cover member 5 such that the first conveying path is defined again in the document conveying unit 4. However, the cover member 5 may be configured to move in an opposite manner. The cover member may return to the open position. Specifically, after the document is conveyed along the first conveying path, the cover member 5 may return to the open position such that the second conveying path is defined again in the document conveying unit 4.

Although, in the above-described embodiment, the image scanning device is configured to be a multi-function device, the image scanning device is not limited to a multi-function device.

While the invention has been described in connection with embodiments of the invention, it will be understood by those skilled in the art that variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being defined by the following claims.

The invention claimed is:

1. A sheet conveying device comprising:
   a housing having a discharge opening;
   a sheet feeder configured to feed a sheet;
   a processing unit configured to perform predetermined processing to the sheet fed by the sheet feeder;
   a conveying unit configured to convey the sheet having undergone the predetermined processing and discharge the sheet in a discharge direction through the discharge opening;
   a cover member movable, relative to the housing, between a closed position in which the cover member covers the discharge opening and an open position in which the cover member exposes the discharge opening;
   a motor configured to generate a driving force; and
   a transmitting mechanism changeable between a first state and a second state and configured to:
      when the transmitting mechanism is in the first state, transmit the driving force from the motor to the conveying unit and cut transmission of the driving force from the motor to the cover member, and
      when the transmitting mechanism is in the second state, transmit the driving force from the motor to the cover member and cut transmission of the driving force from the motor to the conveying unit, such that the cover member moves from the closed position to the open position.

2. The sheet conveying device according to claim 1, wherein the cover member is configured to move from the open position to the closed position when the transmitting mechanism is in the second state.

3. The sheet conveying device according to claim 1, wherein the processing unit is configured to scan the sheet to read an image of the sheet.

4. The sheet conveying device according to claim 1, wherein the cover member is configured to, when in the closed position, be oriented vertically.

5. The sheet conveying device according to claim 1, wherein the cover member is configured to pivot from the closed position to the open position when the transmitting mechanism is in the second state.

6. The sheet conveying device according to claim 1, wherein the cover member is configured to pivot about a lower end thereof, such that an upper end thereof extends in the discharge direction when the cover member is in the open position.

7. The sheet conveying device according to claim 1, wherein the motor is configured to rotate in a first direction and a second direction opposite to the first direction, and the transmitting mechanism is configured to change between the first state and the second state in response to the motor rotating in the first direction and the second direction, respectively.

8. The sheet conveying device according to claim 1, wherein the cover member is configured to, when in the open position, receive the sheet discharged through the discharge opening.

9. The sheet conveying device according to claim 1, wherein the transmitting mechanism includes a gear mechanism including a planet gear configured to receive the driving force of the motor and transmit the driving force selectively to the conveying unit and the cover member.

10. The sheet conveying device according to claim 1, wherein the transmitting mechanism includes a link mechanism, the link mechanism including:
a first link element configured to rotate; and
a second link element coupled to the first link element and to the cover member and configured to move the cover member in response to rotation of the first link element.

11. A sheet conveying device comprising:
a housing having a discharge opening;
a sheet feeder configured to feed a sheet;
a processing unit configured to perform predetermined processing to the sheet fed by the sheet feeder;
a conveying unit configured to convey the sheet having undergone the predetermined processing and discharge the sheet in a discharge direction through the discharge opening;
a discharged-sheet support movable between a retracted position in which the discharged-sheet support is unable to support the discharged sheet and an extended position in which the discharged-sheet support is extended in the discharge direction relative to the retracted position and able to support the discharged sheet;
a motor configured to generate a driving force; and
a transmitting mechanism changeable between a first state and a second state and configured to:
when the transmitting mechanism is in the first state, transmit the driving force from the motor to the conveying unit and cut transmission of the driving force from the motor to the discharged-sheet support, and
when the transmitting mechanism is in the second state, transmit the driving force from the motor to the discharged-sheet support and cut transmission of the driving force from the motor to the conveying unit, such that the discharged-sheet support is configured to move from the retracted position to the extended position.

12. The sheet conveying device according to claim 11, wherein the discharged-sheet support is configured to move from the extended position to the retracted position when the transmitting mechanism is in the second state.

13. The sheet conveying device according to claim 11, wherein the processing unit is configured to scan the sheet to read an image of the sheet.

14. The sheet conveying device according to claim 11, wherein the discharged-sheet support is configured to, when in the retracted position, be oriented vertically.

15. The sheet conveying device according to claim 11, wherein the discharged-sheet support is configured to pivot from the retracted position to the extended position when the transmitting mechanism is in the second state.

16. The sheet conveying device according to claim 15, wherein the discharged-sheet support is configured to pivot about a lower end thereof, such that an upper end thereof extends in the discharge direction when the discharged-sheet support is in the extended position.

17. The sheet conveying device according to claim 11, wherein the motor is configured to rotate in a first direction and a second direction opposite to the first direction, and the transmitting mechanism is configured to change between the first state and the second state in response to the motor rotating in the first direction and the second direction, respectively.

18. The sheet conveying device according to claim 11, wherein the transmitting mechanism includes a gear mechanism including a planet gear configured to receive the driving force of the motor and transmit the driving force selectively to the conveying unit and the discharged-sheet support.

19. The sheet conveying device according to claim 11, wherein the transmitting mechanism includes a link mechanism, the link mechanism including:
a first link element configured to rotate; and
a second link element coupled to the first link element and to the discharged-sheet support and configured to move the discharged-sheet support in response to rotation of the first link element.

* * * * *